United States Patent [19]

Saad

[11] Patent Number: 4,895,766

[45] Date of Patent: Jan. 23, 1990

[54] BAKEWARE COATING

[75] Inventor: William T. Saad, Burnt Hills, N.Y.

[73] Assignee: General Electric Company, Waterford, N.Y.

[21] Appl. No.: 171,978

[22] Filed: Mar. 23, 1988

[51] Int. Cl.$^4$ .......................... B32B 9/04; C08G 77/04
[52] U.S. Cl. .................................. 428/447; 524/266; 524/268; 525/477; 528/33
[58] Field of Search ............... 524/266, 268; 525/477; 528/33; 428/447

[56] References Cited

U.S. PATENT DOCUMENTS

| | | | |
|---|---|---|---|
| 4,049,873 | 9/1977 | Creasey et al. | 525/477 |
| 4,121,000 | 10/1978 | Wald | 428/35 |
| 4,252,702 | 2/1981 | Wald | 260/29.1 |
| 4,262,043 | 4/1981 | Wald | 427/387 |
| 4,332,844 | 6/1982 | Hamada et al. | 528/33 |
| 4,477,517 | 10/1984 | Rummel | 428/324 |
| 4,537,800 | 8/1985 | Kuziemka | 427/327 |
| 4,544,692 | 10/1985 | Kuziemka | 524/361 |
| 4,585,705 | 4/1986 | Broderick et al. | 428/447 |
| 4,677,147 | 6/1987 | Swihart et al. | 524/268 |
| 4,681,908 | 7/1987 | Broderick et al. | 524/268 |
| 4,684,577 | 8/1987 | Coq | 428/447 |

*Primary Examiner*—John C. Bleutge
*Assistant Examiner*—R. Dean, Jr.

[57] ABSTRACT

Coating compositions for bakeware release are disclosed to contain (a) base silicone resin having alkoxy or acyloxy functional groups and a viscosity between 10 to 200,000 centipoise; (b) base polydiorganosiloxane fluid having functional groups to react with the base resin; (c) a hydroxy functional polyphenylsiloxane resin; (d) a nonthermosettable polydiorganosiloxane fluid; and (e) an effective amount of condensation catalyst.

46 Claims, No Drawings

BAKEWARE COATING

The present invention relates to bakeware coating compositions. More particularly, the present invention relates to bakeware coating compositions which are high in solids and have a prolonged useful life.

BACKGROUND OF THE INVENTION

Industrial bakeware is presently coated with a variety of coating compositions to provide release of bakery goods. These coating compositions desirably provide release through a maximum number of baking cycles and are easily applied in the reconditioning of such bakeware.

Silicone based coating compositions have been found most appropriate to the application of bakeware release. U.S. Pat. No. 4,585,705 discloses a composition cured from a silicone resin and silicone fluid for use on cookware and bakeware. Variations of this basic formulation are found in U.S. Pat. Nos. 4,681,908 and 4,677,147. U.S. Pat. No. 4,121,000 discloses a composition cured from a silicone resin, epoxy resin and silicone fluid for use on bakeware. Further bakeware release coatings might contain fluorocarbon polymers with silicone polymers or might contain multilayers with varied compositions.

Developmental work for bakeware release coatings is focused on three primary issues. Release of the coatings should be improved or maintained while at the same time prolonging the useful life of the coating and reducing the solvent emissions of its application.

Thus, it is an object of the present invention to prolong the useful life of bakeware release coatings.

It is another object to reduce or eliminate solvent emissions with bakeware release coating application.

SUMMARY OF THE INVENTION

Briefly, according to the present invention there is provided a coating composition on bakeware comprising the reaction product of:

(a) 100 parts by weight of at least one base silicone resin having alkoxy or acyloxy functional groups and a viscosity of from 10 to about 200,000 centipoise at 25° C.;

(b) from about 50 to about 2,000 parts by weight of at least one polydioganosiloxane fluid having a viscosity between about 5 and 5,000 centipoise at 25° C. and having functional groups which will react with the alkoxy or acyloxy functional groups of the silicone resin;

(c) from about 1 to about 30% by weight based on (a) and (b) a hydroxy functional polyphenylsiloxane resin containing $C_6H_5SiO_{3/2}$ units, $(C_6H_5)_2SiO_{2/2}$ units, or $(C_6H_5)CH_3SiO_{2/2}$ units;

(d) from about 0.5 to about 5% by weight based on (a) and (b) a nonthermosettable polydiorganosiloxane fluid; and (e) an effective amount of condensation catalyst to cure the composition.

DETAILED DESCRIPTION OF THE INVENTION

The base silicone resin suitable for use herein have a viscosity of from about 10 to about 200,000 centipoise at 25° C., and preferably, a viscosity of from about 25 to about 2500 centipoise at 25° C. Such resins generally from about 0 to about 10% by weight hydroxy functional groups, from about 0 to about 30% by weight molar equivalent methoxy groups of alkoxy or acyloxy functional groups and may be broadly described by the general formula:

$$R_aSiO_{(4-a)/2} \tag{1}$$

wherein R is a substituted or unsubstituted hydrocarbon radical of from 1 to about 10 carbon atoms, and "a" is on average from about 0.75 about to 1.9, and more preferably, from about 0.9 to about 1.5. Examples of hydrocarbon radicals included by R are alkyl radicals such as methyl, ethyl, n-propyl, isopropyl, n-butyl and sec-butyl radicals as well as octyl radicals; cycloalkyl radicals such as the cyclopentyl, cyclohexyl and cycloheptyl radicals; alkenyl radicals such as the vinyl and allyl radicals; aryl radicals such as the phenyl radical; alkarly radicals such as the tolyl radical; and aralkyl radicals such as the benzyl radical. Examples of substituted hydrocarbon radicals represented by R are the halogenated can be any alkyl radical, aryl radical, aralkyl radical, alkaryl radical, alkenyl radical, or a halogen or cyano derivative thereof as described above. The manufacture of solid MQ resins is well known to persons skilled in the art through various U.S. Patents. The teachings of such patents can be adapted to produce MQ resins meeting the requirements herein.

A DT resin is a polymer having $R_2SiO_{2/2}$ and $RSiO_{3/2}$ units wherein the ratio of D to T units is from about 0:1 to about 2.5:1 and preferably from about 0.05:1 to about 1:1. Suitable DT resins as well as their methods of preparation are well known, and persons skilled in the art can readily adapt the prior art teachings to produce such resins.

As stated above, silicone resins suitable for use herein have from about 0 to about 10% by weight hydroxy functional groups and up to about 30% by weight molar equivalent methoxy group of alkoxy or acyloxy functional groups. The weight of molar equivalent methoxy groups may be derived by substituting actual acyloxy or alkoxy functional groups with equimolar theoretical methoxy groups. As a general rule, a silicone resin which has a high proportion of hydroxy functional groups and a high proportion of units with functionality of three or four will be solid at room temperature. On the other hand, depending upon molecular weight, a silicone resin having an increased number of alkoxy or acyloxy functional groups has an increased tendency to be liquid at room temperature. Thus, it is essential to the resins used herein that there be at least a sufficient amount of alkoxy or acyloxy functionality or a sufficient ratio of alkoxy or acyloxy functional groups to hydroxy functional groups on a resin to monovalent hydrocarbon radicals such as the 1,1,1-trifluoropropyl and the alpha, alpha, alpha-trifluorotolyl radical as well as chlorophenyl and dichlorophenyl radicals and various other radicals not interfering with resin manufacture, including acryloxypropyl, glycidoxypropyl, gamma-aminopropyl, etc. However, because they are more readily available, it is preferred that at least 85 percent of the R radicals be methyl or phenyl radicals and that at least 50 percent of the R radicals be methyl radicals. Preferred alkoxy or acyloxy functional groups are silicon bonded alkoxy groups and silicon bonded acyloxy groups having from 1 to about 8 carbon atoms.

Preferred silicone resins may be classified as either MQ resins, that is resins containing $R_3SiO_{1/2}$ and $SiO_{4/2}$ units, or DT resins, that is resins containing $R_2Si$ $O_{2/2}$ and $RSiO_{3/2}$ units. It is especially preferred that the instant invention be practiced with DT resins.

An MQ resin is a copolymer having $R_3SiO_{0.5}$ and $SiO_2$ units wherein the number ratio of $R_3SiO_{0.5}$ to $SiO_2$ units is from about 0.25:1 to about 2:1. MDQ resins are copolymers having $R_3SiO_{0.5}$ units, $R_2SiO$ units, and $SiO_2$ units, wherein the ratio of $R_3SiO_{0.5}$ to $SiO_2$ units is from about 0.25:1 to about 0.8:1 and the ratio of $R_2SiO$ units to $SiO_2$ units can be up to about 3:1>. In the foregoing formulas, R produce a resin within the required viscosity range. Further, for any given alkoxy or acyloxy functional group content, it is essential that the molecular weight of the resin be sufficiently low that the viscosity limitations are met. It is preferred for use herein, that the silicone resin contain from about 0 to about 5% by weight hydroxy functional groups and from about 10% to about 25% by weight molar equivalent methoxy groups of alkoxy or acyloxy functional groups. Preferred molecular weight will practically vary as a function of the average value of "a" in formula 1 above and the hydroxy, alkoxy, and acyloxy content. The most preferred embodiments of the invention utilize methoxy groups or a mixture of methoxy and hydroxy groups as the reactive functional group of the silicone resin.

The polydiorganosiloxane fluid can be any substantially linear silicone polymer which contains functional groups which will react with the functional groups of the silicone resin. These polydiorganosiloxane fluids and their methods of manufacture are well known to those of ordinary skill in the art. Preferably, the reactive functional groups will be, for example silanol, alkoxy, acyloxy and the like.

Preferred polydiorganosiloxane fluids contain terminal reactive functional groups. Certain preferred polydiorganosiloxane fluids are of the general formula:

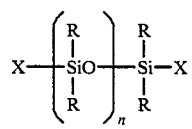

(2)

where R is independently selected and defined above; X is hydroxy, alkoxy and acyloxy; and n is an integer such that the viscosity of the polydiorganosiloxane is from about 5 centipoise to about 5,000 centipoise at 25° C. Another preferred polydiorgansiloxane contains $R_2SiO_{2/2}$ units and $RSiO_{3/2}$ units where R is defined above and again having a viscosity of from 5 to about 5,000 centipoise at 25° C. The ratio of $R_2SiO_{2/2}$ units to $RSiO_{3/2}$ units ranges from 100/1 to 100/20. In more preferred embodiments of the present invention the viscosity of the polydiorganosiloxane fluid is from about 10 centipoise to about 1000 centipoise at 25° C. and, most preferably, is from about 20 centipoise to about 500 centipoise at 25° C.

Suitable polyphenylsiloxane resins contain $C_6H_5$ $SiO_{3/2}$ units, $(C_6H_5)_2SiO_{2/2}$ units, or $(C_6H_5)$ $CH_3$ $SiO_{2/2}$ units. Other units in the resin might be, for example, $CH_3SiO_{3/2}$ units, $(CH_3)_2SiO_{2/2}$ units, $(CH_3)_3SiO_{1/2}$ units, etc. The polyphenylsiloxane should contain units which will render it reactive with components (a) and (b). Thus, it should contain from about 0.5 to about 5% by weight hydroxy radicals which are attached to silicon atoms. Further, to qualify as a polyphenylsiloxane resin, there should be a number ratio of $C_6H_5$- to silicon of from 0.35 to 0.85. Otherwise, there should be an organic group to silicon number ratio of from 0.8 to 1.4.

The copolymer can be prepared by known commercial means such as, for example, by the hydrolysis and condensation of chloro- or alkoxy silanes. These base siloxanes are commercially available and elaboration on the details of their preparation is believed to be unnecessary herein. It should be noted that upon condensation of the hydrolyzate, and subsequent catalytic bodying using techniques known in the art, this base siloxane can be obtained essentially solvent-free and it is preferred for this invention that the polyphenolsiloxane resin be utilized to form the composition of this invention in such a form. If the polyphenylsiloxane resin is used in solvent, it can be easily dissolved in common organic solvents such as xylene, toluene, naphtha and the like.

The nonthermosettable polydiorganosiloxane fluid is a well known release agent for bakeware coatings, as disclosed in U.S. Pat. No. 4,677,147, hereby incorporated by reference. These fluids may be represented by the general formula:

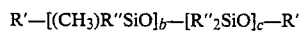

where R' independently denotes methyl or phenyl radicals, R" independently denotes methyl, ethyl or phenyl radicals, b is 0 or greater, and the sum of b and c is between about 20 and about 3,000. The nonthermosettable polydiorganosiloxane fluid must also be incompatible with the base resin component (a) of the invention. Incompatible in this case should be understood to mean that when the resin and fluid are mixed together, the two will separate upon standing after a period of time, preferably several days or less.

The degree of polymerization of the nonthermosettable fluids can vary widely within the limits already mentioned. Polydimethylsiloxane fluids with degrees of polymerization between 200 and 800 are preferred with degrees of polymerization of about 500 being the most preferred.

It is preferable to use room temperature pourable nonthermosettable fluids to ease the application of the uncured coating to the metal substrate, but it is not required. When more viscous fluids are used, the mixture can be diluted with a volatile solvent to ease the application of the release coating to the substrate. The nonthermosettable fluids must be of a sufficient degree of polymerization as to not volatilize while the mixture is being heated to cure the thermosetting polyorganosiloxanes. Generally fluid with a vapor pressure less than 20 mm Hg at 300° C. meets this requirement.

The phenyl to alkyl radical ratio of the nonthermosettable fluid can vary and it is preferred to use fluids which contain phenyl radicals, as phenyl containing fluids are more temperature stable than the pure dimethyl fluids. Mixtures of polydimethylsiloxane fluids and polymethylphenylsiloxane fluids can be used.

For coating compositions herein, it is preferred that the polydiorganosiloxane fluid (b) should be compatible with the base silicone resin (a) in order to obtain optimum properties in the cured coating. When the polydiorganosiloxane fluid and silicon resin are compatible, a clear composition is formed and no phase separation is observed. Compatibility of the resin and fluid is improved where substantially the same R groups or organo substituents are present on each. For example, where the resin contains phenyl groups, compatibility will be improved where the fluid is phenyl containing.

Compatibility is also improved upon decreasing the silicone chain length of the fluid. Compatibility is desired in components (a) and (b) because these components make up a large portion of the composition and if they don't separate will make remixing more convenient. It is clear that component (c) will generally not be compatible with the other components and that component (d) is by definition incompatible with the other components.

A practical advantage of compositions disclosed herein is that it is not necessary to employ organic solvents and even if employed, they have the desired effect at low amounts. Solvent may be employed with component (c) which may be solid or a viscous liquid. Solvent may be added to the mixed composition to prevent separation of compound (d). Further, solvent may be added to control applied coating thicknesses keeping in mind, however, that any solvent added might require subsequent recovery. Preferred herein are common organic solvents, including toluene, xylene naphtha, and the like.

The amounts and relative proportions of components (a) and (b) are intended to control basic properties of the bakeware coating. For instance, greater flexibility may be desired in the cured coating and thus polydiorganosiloxane fluid (b) may be increased. In contrast, it may be desired to increase the hardness of the cured coating and thus base silicone resin (a) content may be increased. Broadly, it is recommended that from 50 to 2,000 parts by weight polydiorganosiloxane fluid (b) be added for each 100 parts by weight silicone resins (a). However, preferred coating compositions herein contain from about 100 to 1,000 parts by weight component (b) for each 100 parts by weight of component (a). It has been found to be particularly advantageous to produce a coating composition having from about 200 to about 1,000 parts by weight component (b) for each 100 parts by weight component (a).

With the basic properties of the coating established in components (a) and (b), polyphenylsiloxane resin and nonthermosettable polydiorganosiloxane fluid are present for their special effect. Polyphenylsiloxane resin is added to control cracking up to the decomposition temperature of silicone polymers. An effective amount of this component (c) is generally from about 1 to 30% by weight based on components (a) and (b) and preferably from about 2 to about 15% by weight. Nonthermosettable polydiorganosiloxane fluid is added as a release agent. There should be employed of this component (d) from about 0.5 to about 5% by weight based on components (a) and (b) and preferably from about 1 to about 3% by weight. Solvent may be employed for any of the purposes stated above in amounts as required. Generally from about 1 to about 25% by weight solvent is employed based on silicone solids. Most commonly from about 5% to 20% by weight is employed.

Suitable condensation catalysts may be the same as those which have been employed heretofore in the production of coatings from thermosetting organopolysiloxane compositions. Examples of suitable condensation catalysts are lead compounds such as lead carbonate, basic lead carbonate, i.e., a compound corresponding to the formula $Pb_3(OH)_2(CO_3)_2$, lead monoxide, lead dioxide and lead naphthenate, as well as carboxylic acid salts of zirconium, calcium, aluminum, iron, zinc, tin, cobalt and/or cerium, such as zirconium-2-ethylhexoate, zinc naphthenate, zinc-2-ethylhexoate, tin octoate, dibutyltin diacetate, cobalt octoate, ferric naphthenate, calcium stearate, cobalt naphthenate, aluminum naphthenate, cerium octoate and cerium naphthenate; quaternary ammonium compounds such as tetramethylammoniumacetate; and metal alcoholates such as aluminum isopropylate- and polymeric butyltitanate. Mixtures of various condensation catalysts may also be employed. When condensation catalysts are used, they may be employed in the same amounts as those used heretofore in the manufacture of coatings from thermosetting compositions containing organopolysiloxanes and condensation catalysts. Generally, an effective amount of condensation catalyst will range from about 0.005 to 5 percent by weight metal based on the weight of total organopolysiloxanes.

Pigments, reinforcing agents, and UV screens, etc. may be added according to the skill of the art. Suitable pigments include titanium dioxide and suitable reinforcing agents include mica.

The bakeware compositions of the present invention are prepared by simply mixing the base silicone resin, the polydiorganosiloxane fluid, the polyphenylsiloxane resin, the nonthermosettable polydiorganosiloxane fluid, the condensation catalyst, pigments and solvent. In some instances, mixing can be accomplished by stirring or slight shaking while in other instances high energy mechanical blending may be required. Should the blend separate prior to use additional mixing will restore the blend to its original intimately admixed condition. At this point improved compatibility may also be obtained by partially reacting the fluid and the resin by heating in the presence of a suitable catalyst as appropriate to prevent total reaction. As above, the polyphenylsiloxane resin is conveniently dissolved in solvent prior to mixing.

The coating is applied to bakeware by conventional methods, such as dipping, spraying, brushing or the like to a cured thickness of at least about 0.1 mils. It is a particular advantage of pigmented coating compositions that thick section coatings may be applied and cured. Thus, coating thickness of from about 1 to about 125 mil are possible. Following application, curing at elevated temperatures is required. Such further curing is normally accomplished by placing the coated bakeware in an oven maintained at a temperature of from about 50° C. to about 300° C. for about one minute to about three hours. The preferred cycle is 220° C. for one hour.

Bakeware on which the coating compositions herein is applied has an improved useful life, lasting an increased number of baking cycles. Thus steel, aluminum, copper, plastic, etc., bakeware can be initially produced and reconditioned for greater use and longer life.

The following examples are by way of illustration and not limitation. All parts are in parts by weight.

INGREDIENTS

Base Silicone Resin

BSR, 92 grams of methyltrimethoxysilane (0.68 mole), 8 grams of dimethyl dimethoxy silane (0.67 mole) and 0.14 grams methyltrichlorosilane (0:0009 mole) was hydrolyzed by the addition of 16.0 grams of water (0.89 mole). The resultant hydrolyzate was neutralized by the addition of 0.3 gram calcium carbonate and was stripped to 65° C. at 200 torr. The resultant resin had a viscosity of 640 centipoise at 25° C.

Base Polydiorganosiloxane Fluid

BPF, silanol stopped polydimethylsiloxane fluid having 2-12% by weight hydroxyl.

Polyphenylsiloxane Resin A

PSRA, a resin containing 10% by number $CH_3SiO_{3/2}$ units, 20% by number $(C_6H_5)SiO_{3/2}$ units, 40% by number $(CH_3)_2SiO_{2/2}$ units, and $(C_6H_5)_2SiO_{2/2}$ units with 2-6% by weight hydroxy functions at 86% by weight in naphtha.

Nonthermosettable Polydiorganosiloxane Fluid

NPF, 40 parts dimethyldiphenylsiloxane, 8 parts 30,000 centipoise, $(CH_3)_3SiO_{1/2}$ stopped, 200 centipoise, dimethyldiphenyl siloxane, 2 parts dimethylsiloxane and 50 parts xylene.

Catalyst A-Iron octoate, 1% iron in solvent.
Catalyst B-Iron octoate, 6% iron in solvent.

Polyphenylsiloxane Resin B

PSRB, resin containing 40% by number $CH_3SiO_{1/2}$ units, $(C_6H_5SiO_{3/2})$, $(CH_3)_2SiO_{2/2}$ units and about 6% by weight hydroxy functions at 50% solids in toluene and naphtha.

EXAMPLES 1-3

The following compositions were flow coated onto aluminum panels, allowed to drain in vertical alignment for 20 minutes and cured for one hour in a 220° C. oven. Each sample was tested at 3 points on its surface according to each of the following procedures. Firstly, cheesecloth wetted with methylethylketone is rubbed with firm and even pressure on the surface. Reported is the number of strokes before the bare metal is observed. A pencil eraser is rubbed on the surface with firm and even pressure. Reported is the number of strokes to observe bare metal. A dropper is used to place 4 to 6 clustered drops of water on a horizontal surface. The surface is inclined until the water runs. Reported is the angle of incline.

| Example | 1 | 2 | 3 |
|---|---|---|---|
| BSR | — | 31.5 | 28 |
| BPF | — | 58.5 | 52 |
| PSRA | — | 10 | 20 |
| PSRB | 100 | — | — |
| NPF | 1 | 3 | 3 |
| Catalyst A | — | 0.5 | 0.5 |
| Catalyst B | 0.5 | — | — |
| Solvent | 115 | — | — |
| MEK rub | <20, <20, <20 | >100, >100, >100 | >100, >100, >100 |
| Pencil rub | <4, <4, <4 | 40, 40, 40 | 40, 30, 30 |
| Slip angle | 15, 15, 12 | 10, 10, 15 | 7, 7, 10 |

What is claimed is:

1. A cured coating on bakeware consisting essentially of the reaction product of:
   (a) 100 parts by weight of at least one base silicone resin having alkoxy or acyloxy functional groups and a viscosity of from 10 to about 200,000 centipoise at 25° C.;
   (b) from about 50 to about 2,000 parts by weight of at least one base polydiorganosiloxane fluid different from component (a) having a viscosity between about 5 and 5,000 centipoise at 25° C. and having functional groups selected from the group consisting of silanol, alkoxy, and acyloxy;
   (c) from about 1 to about 30% by weight based on (a) and (b) a hydroxy functional polyphenylsiloxane resin containing $C_6H_5SiO_{3/2}$ units, $(C_6H_5)_2SiO_{2/2}$ units, or $(C_6H_5)CH_3SiO_{2/2}$ units;
   (d) from about 0.5 to about 5% by weight based on (a) and (b) a nonthermosettable polydiorganosiloxane fluid; and
   (e) an effective amount of condensation catalyst to cure the composition.

2. The coated bakeware of claim 1 wherein said base silicone resin has the general formula:

$$R_a SiO_{(4-a)/2}$$

wherein R is a substituted or unsubstituted hydrocarbon radical having from about 1 to about 10 carbon atoms and "a" is on average from about 0.75 to about 1.9.

3. The coated bakeware of claim 1 wherein said base silicone resin is a copolymer having $R_2SiO_{2/2}$ and $RSiO_{3/2}$ units.

4. The coated bakeware of claim 1 wherein said base silicone resin contains from about 0 to about 10% by weight hydroxy functional groups and up to about 30% by weight molar equivalent methoxy groups of alkoxy or acyloxy functional groups.

5. The coated bakeware of claim 1 wherein said base silicone resin contains from about 0 to about 5% by weight hydroxy functional groups and from about 10 to about 25% by weight molar equivalent methoxy groups of alkoxy or acyloxy functional groups.

6. The coated bakeware of claim 1 wherein the viscosity of said base silicone resin is controlled by the alkoxy or acyloxy functionality.

7. The coated bakeware of claim 4 wherein the viscosity of said base silicone resin is controlled by the ratio of alkoxy or acyloxy functional groups to hydroxy functional groups.

8. The coated bakeware of claim 4 wherein the viscosity of said base silicone resin is controlled by the ratio of alkoxy or acyloxy functional groups to hydroxy functional groups and molecular weight.

9. The coated bakeware of claim 1 wherein said base silicone resin and said base polydiorganosiloxane fluid are compatible.

10. The coated bakeware of claim 9 wherein the base silicone resin and base polydiorganosiloxane fluid have substantially the same organo substituents to render said resin and fluid compatible.

11. The coated bakeware of claim 1 wherein said base polydiorganosiloxane fluid has the general formula:

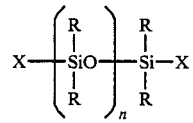

wherein R is a substituted or unsubstituted hydrocarbon radical of from 1 to about 10 carbon atoms; X is selected from the group consisting of hydroxy, alkoxy and acyloxy; and n is an integer to give the stated viscosity.

12. The coated bakeware of claim 1 wherein said resin has a viscosity between about 25 and about 2500 centipoise at 25° C.

13. The coated bakeware of claim 1 wherein there is present for each 100 parts by weight of said base silicone resin from about 50 to about 1000 parts by weight said base polydiorganosiloxane fluid.

14. The coated bakeware of claim 1 wherein said polyphenylsiloxane resins contain from 0.5 to 5% by weight hydroxy radicals.

15. The coated bakeware of claim 1 wherein said polyphenylsiloxane resins have a ratio of $C_6H_5$- groups to silicon of from 0.35 to 0.85 by number.

16. The coated bakeware of claim 1 wherein said polyphenylsiloxane resins have a ratio of organic groups to silicon of from 0.8 to 1.4 by number.

17. The coated bakeware of claim 1 wherein said polyphenylsiloxane resins are copolymers with siloxane units selected from $CH_3SiO_{3/2}$ units, $CH_3SiO_{2/2}$ units or $(CH_3)_3SiO_{1/2}$ units.

18. The coated bakeware of claim 1 wherein said nonthermosettable polydiorganosiloxane fluid has the general formula:

$$R^1—[(CH_3)R''SiO]_b—[R''_2SiO]_c—R^1$$

where $R^1$ independently is methyl or phenyl radical, $R''$ independently is methyl, ethyl or phenyl; b is 0 or greater; and the sum of b and c is between about 20 and about 3,000.

19. The coated bakeware of claim 1 wherein said nonthermosettable polydiorganosiloxane fluid is incompatible with component (a).

20. The coated bakeware of claim 1 wherein said nonthermosettable polydiorganosiloxane fluid has a vapor pressure less than 20 mm Hg at 300° C.

21. The coated bakeware of claim 1 wherein the coating has a thickness of at least about 0.1 mil.

22. The coated bakeware of claim 1 wherein there is from 2 to 15% by weight polyphenylsiloxane resin based on (a) and (b).

23. A coating composition for bakeware consisting essentially of:
(a) 100 parts by weight of at least one base silicone resin having alkoxy or acyloxy functional groups and a viscosity of from 10 to about 200,000 centipoise at 25° C.;
(b) from about 50 to about 2,000 parts by weight of at least one base polydiorganosiloxane fluid different from component (a) having a viscosity between about 5 and 5,000 centipoise at 25° C. and having functional groups selected from the group consisting of silanol, alkoxy, and acyloxy;
(c) from about 1 to about 30% by weight based on (a) and (b) a hydroxy functional polyphenylsiloxane resin containing $C_6H_5SiO_{3/2}$ units, $(C_6H_5)_2SiO_{2/2}$ units, or $(C_6H_5)CH_3SiO_{2/2}$ units;
(d) from about 0.5 to about 5% by weight based on (a) and (b) a nonthermosettable polydiorganosiloxane fluid; and
(e) an effective amount of condensation catalyst to cure the composition.

24. The composition of claim 23 further comprising from about 1 to about 25% by weight organic solvent.

25. The composition of claim 23 which further comprises from about 5 to about 20% by weight solvent.

26. The composition of claim 23 wherein said silicone resin has the general formula:

$$R_aSiO_{(4-a)/2}$$

wherein R is a substituted or unsubstituted hydrocarbon radical having from 1 to about 10 carbon atoms and "a" is on average from about 0.75 to about 1.9.

27. The composition of claim 23 wherein said silicone resin is a copolymer having $R_2SiO_{2/2}$ and $R_3SiO_{3/2}$ units.

28. The composition of claim 23 wherein said silicone resin contains from about 0 to about 10% by weight hydroxy functional groups and up to about 30% by weight molar equivalent methoxy groups of alkoxy or acyloxy functional groups.

29. The composition of claim 23 wherein said base silicone resin contains from about 0 to about 5% by weight hydroxy functional groups and from about 10 to about 25% by weight molar equivalent methoxy groups of alkoxy or acyloxy functional groups.

30. The composition of claim 23 wherein the viscosity of said base silicone resin is controlled by the alkoxy or acyloxy functionality.

31. The composition of claim 28 wherein the viscosity of said base silicone resin has a sufficient is controlled by the ratio of alkoxy or acyloxy functional groups to hydroxy functional groups.

32. The composition of claim 28 wherein the viscosity of said base silicone resin has a sufficient is controlled by the ratio of alkoxy or acyloxy functional groups to hydroxy functional groups and molecular weight.

33. The composition of claim 23 wherein said base silicone resin and said base polydiorganosiloxane fluid are compatible.

34. The composition of claim 23 wherein the base silicone resin and base polydiorganosiloxane fluid have substantially the same organo substituents to render said resin and fluid compatible.

35. The composition of claim 23 wherein said base polydiorganosiloxane fluid has the general formula:

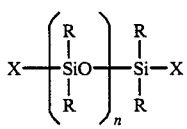

wherein R is a substituted or unsubstituted hydrocarbon radical of from 1 to about 10 carbon atoms; X is selected from the group consisting of hydroxy, alkoxy and acyloxyl and n is an integer to give the stated viscosity.

36. The composition of claim 23 wherein said base resin has a viscosity between about 25 and about 2500 centipoise at 25° C.

37. The composition of claim 23 wherein there is present for each 100 parts by weight said base silicone resin, from about 50 to about 1000 parts by weight said base polydiorganosiloxane fluid.

38. The composition of claim 23 wherein said polyphenylsiloxane resins contain from 0.5 to 5% by weight hydroxy radicals.

39. The composition of claim 23 wherein said polyphenylsiloxane resins have a ratio of $C_6H_5$-groups to silicon of from 0.35 to 0.85 by number.

40. The composition of claim 23 wherein said polyphenylsiloxane resins have a ratio of organic groups to silicon of from 0.8 to 1.4 by number.

41. The composition of claim 23 wherein said polyphenylsiloxane resins are copolymers with siloxane units selected from $CH_3SiO_{3/2}$ units, $CH_3SiO_{2/2}$ units or $(CH_3)_3SiO_{1/2}$ units.

42. The composition of claim 23 wherein said non-thermosettable polydiorganosiloxane fluid has the general forumla:

$$R^1-[(CH_3)R''SiO]_b-[R''_2SiO]_c-R^1$$

where $R^1$ independently is methyl or phenyl radical, $R''$ independently is methyl, ethyl or phenyl; b is 0 or greater; and the sum of b and c is between about 20 and about 3,000.

43. The composition of claim 23 wherein said non-thermosettable polydiorganosiloxane fluid is incompatible with component (a).

44. The composition of claim 23 wherein said non-thermosettable polydiorganosiloxane fluid has a vapor pressure less than 20 mm Hg at 300° C.

45. The composition of claim 23 wherein the composition is applied as a coating to a thickness of at least about 0.1 mil.

46. The composition of claim 23 wherein there is from 2 to 15% by weight polyphenylsiloxane resin based on (a) and (b).